March 17, 1925.
H. E. WARREN
1,530,445
AUTOMATIC SYNCHRONIZING APPARATUS
Original Filed Jan. 4, 1922
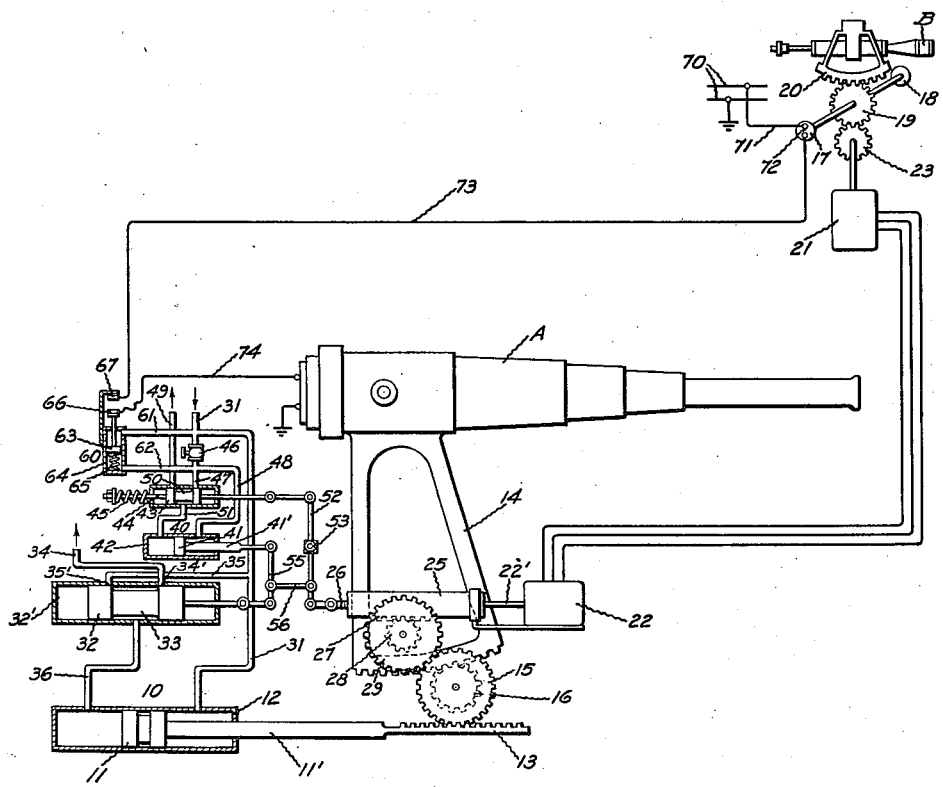
Inventor:
Henry E. Warren,
by Albert G. Davis
His Attorney.

Patented Mar. 17, 1925.

1,530,445

UNITED STATES PATENT OFFICE.

HENRY E. WARREN, OF ASHLAND, MASSACHUSETTS, ASSIGNOR TO GENERAL ELECTRIC COMPANY, A CORPORATION OF NEW YORK.

AUTOMATIC SYNCHRONIZING APPARATUS.

Application filed January 4, 1922, Serial No. 527,010. Renewed August 11, 1924.

*To all whom it may concern:*

Be it known that I, HENRY E. WARREN, a citizen of the United States, residing at Ashland, in the county of Middlesex, State of Massachusetts, have invented certain new and useful Improvements in Automatic Synchronizing Apparatus, of which the following is a specification.

My invention relates to automatic synchronizing apparatus and has for its object the provision of means for driving an object in response to movement of and in synchronism with a moving object.

More specifically my invention relates to means for automatically controlling a motor in response to movement of a moving object so as to cause the motor to drive an object in synchronism with the moving object. Although it has various applications in the driving of one object in synchronism with another, whether the objects are given movement of translation or rotation, my invention is particularly adapted to the control of ordnance in response to movement of a remote sighting device.

In various arrangements heretofore devised for the control of one object in response to the movement of another, the driven object has lagged behind the moving object by an amount sufficient to cause the driving motor to operate the driven object at the same speed as the moving object. With such arrangements the driven object is in positional agreement with the moving object only upon reversal of the moving object or when the moving object is brought to rest. I have found that it is often desirable to eliminate this angle of lag so that the driven object is actuated in synchronism with the moving object. This is particularly true in the control of ordnance in response to movement of a sighting device since when controlled in this manner the gun is maintained in firing position at all times. By means of my invention I am enabled automatically to overcome this angle of lag and thus operate the objects in synchronism.

In carrying out my invention I utilize in one form a hydraulic driving motor for the driven object and control means therefor of the type described and claimed in a copending application of Edward M. Hewlett and Waldo W. Willard, Serial No. 503,545, filed Sept. 27, 1921, and assigned to the same assignee as this invention. Associated with the hydraulic driving motor I have provided an auxiliary operating means shown as a hydraulic motor which is operatively connected to the control valve of the former. The control valves of the hydraulic motors are controlled in response to relative movement of the objects, whereby the driving motor is controlled jointly in response to relative movement of the objects and movement of the auxiliary hydraulic motor so as to accelerate the driven object into positional agreement with the moving object and maintain such positional agreement.

For a more complete understanding of my invention, reference should be had to the accompanying drawing, in the single figure of which is shown in diagrammatic form a system for the control of ordnance embodying my invention.

Referring to the drawing, in one embodiment of my invention the position of a gun A is controlled in accordance with the position of a remote sighting device, such as a telescope B. The gun in actuated by means of a hydraulic motor 10 of the piston type, having a driving piston 11 operating in a cylinder 12. The driving piston of the hydraulic motor is provided with a piston rod 11' secured to which is a rack 13. The rack is operatively connected to a gear sector 14 on the gun by gears 15 and 16. The telescope is actuated by the operator by means of handles 17 and 18 connected to a gear 19 which meshes with a gear sector 20 secured to the telescope.

Movement of the telescope is transmitted for the control of the hydraulic motor by means of a suitable system for the transmission of angular movement. In this embodiment of my invention I have shown the so-called selsyn system disclosed in the aforesaid application of Edward M. Hewlett and Waldo W. Willard, comprising a selsyn generator or transmitter 21 and an interconnected selsyn receiving motor or reproducer 22. The selsyn generator is driven in accordance with movement of the telescope by means of gear 23 on the shaft of the motor meshing with gear 19. The selsyn motor 22 is secured to a quill member 25 in which driving shaft 22' of the motor is in screw and nut relation with a valve actuating rod 26. Quill 25 carries a rack 27 which is operatively connected by gears 28 and 29 with gear 15, whereby the quill is moved longitudinally in response to the movement of the gun.

The hydraulic motor 10 is of the differential piston type, the cross sectional area of the piston rod 11' being equal to one-half the area of the piston 11. A suitable hydraulic liquid, such as oil, is supplied at uniform pressure through a pipe 31 to the right hand end of the cylinder 12 against the piston face of reduced area. By means of a control valve 32, pressure is admitted and exhausted from the left hand end of the cylinder to control the movement of the piston. Control valve 32 is cylindrical in shape and provided with a section 33 at its center of reduced size. In the seat 32' for the valve are ports 34' and 35' for pipes 34 and 35, the ports being spaced apart a distance equal to the length of the reduced section 33 so that when the valve is in closed position, as shown in the drawing, both ports are covered. The reduced section 33 provides a chamber around the valve. This chamber is connected to the left hand end of the hydraulic motor by means of a pipe 36. Pipe 34 leads to exhaust, while pipe 35 is connected to hydraulic supply pipe 31. It will be observed that movement of valve 32 to the left from closed position uncovers port 35' admitting hydraulic pressure through pipe 35 to chamber 33 and thence through pipe 36 to the left hand end of cylinder 12, thus forcing piston 11 toward the right, while movement of valve 32 to the right from closed position uncovers port 34' connecting the left hand end of cylinder 12 to exhaust through pipe 36, chamber 33 and pipe 34, thus causing piston 11 to be moved to the left by the hydraulic liquid supplied at full pressure to the right hand end of the cylinder.

In one form of my invention, an auxiliary hydraulic motor 40 having a control valve 41 is provided adjacent the main hydraulic motor 10. Hydraulic motor 40 is similar in construction to the main hydraulic motor 10, having a differential driving piston 41 moving in a cylinder 42, under the control of valve 43. Piston 41 is provided with a piston rod 41'. Valve 43 is provided, however, with a central rod 44 which extends through the left hand end of the valve seat and is biased toward the left by means of a spiral spring 45. Hydraulic liquid is supplied from pipe 31 through a needle valve 46 and pipe 47 to the control valve 43 of the auxiliary motor and through pipe 48 to the right hand end of the cylinder 42. An exhaust outlet pipe 49 is provided for valve 43. Valve 43 is provided with a central section 50 of reduced size forming a chamber which is connected to the left hand end of cylinder 42 through pipe 51. Movement of valve 43 therefore regulates the supply of hydraulic liquid to the left hand end of cylinder 42 for the control of the movement of piston 41, as will be understood with reference to the description of main hydraulic motor 10.

The two control valves 32 and 43 are operatively connected to valve rod 26, and driving piston 41 to the main control valve 32, in one form of my invention, through a system of links and levers, forming linkage mechanism. The auxiliary control valve 43 is connected to valve rod 26 through a lever 52 having a fixed fulcrum 53. Driving piston 41 of the auxiliary hydraulic motor has its piston rod 41' connected to valve 32 by means of a lever 55 having a movable fulcrum on one end of a link 56 the other end of which is pivotally connected to lever 52. The connections of link 56 with levers 52 and 55 are preferably made at about equal distances from and at points near the lower ends of the levers. Lost motion in the system of links and levers is taken up by spring 45.

A pressure controlled contact device 60 is connected through pipes 61 and 62 around needle valve 46. This pressure device comprises a plunger 63 moving in a cylinder 64. The plunger is biased in an upward direction by means of a spiral spring 65 between the plunger and the lower end of the cylinder. Plunger 63 carries an insulated contact 66 which is adapted when the plunger is forced upward by spring 65 to engage a stationary contact 67. Contacts 66 and 67 are in a firing circuit for the gun which leads from a suitable grounded source of electrical supply 70, through conductor 71, a switch 72 in handle 17, conductor 73, contacts 66 and 67, conductor 74 and the firing contacts of the gun to ground. Needle valve 46 is adjusted to have a suitable restricted opening. It will be observed that when there is no drop in hydraulic pressure across the needle valve, the spring will force plunger 63 upward bringing contact 66 into engagement with contact 67. In case, however, that hydraulic liquid is being supplied through the needle valve to the auxiliary motor, there will be a drop in pressure across the needle valve which causes a reduction in pressure in the lower end of cylinder 64. The needle valve is adjusted to give sufficient drop in pressure to cause plunger 63 to be forced downward by the preponderance of pressure in the upper end of cylinder 64, whereby contact 66 is disengaged from contact 67.

As thus constructed and arranged and with the valves closed and the gun in a position corresponding with the position of the telescope, as shown in the drawing, the operation of my invention is as follows: The telescope is moved on the target by means of handles 17 and 18, selsyn generator 21 being actuated at the same time. This movement applied to generator 21 is reproduced by selsyn motor 22 which produces through its screw and nut connection therewith a translation of valve rod 26 in one direction or the other depending on the direction of movement applied to the telescope. The movement of the valve rod is transmitted to valve 32 through link 56 and to valve 43 through lever 52. This opens both valves, valve 32 controlling hydraulic motor 10 to drive the gun in the direction in which the telescope was moved and at the same time move quill 25 through gears 28 and 29 in a direction opposite to that in which valve rod 26 was moved. Quill 25 carries valve rod 26 with it and thus tends to move the valve rod back to its initial position in space and giving a corresponding closing movement to valve 32. Simultaneously with this action auxiliary motor 40 operates effecting a displacement of valve 32 through lever 55.

The action of the auxiliary hydraulic motor will best be understood by first considering the operation were the auxiliary hydraulic motor disconnected and valve rod 26 connected directly to valve 32. In such case it will be observed that the gun would be in a position corresponding with the position of the telescope only when valve 32 had been returned to closed position, valve rod 26 then being in its initial position in space. With the telescope moving at a constant velocity, however, it would be impossible for the hydraulic motor to bring the gun into angular agreement with the telescope because this would involve closing its own valve. The gun would, therefore, lag by an amount necessary to cause a displacement of valve rod 26 sufficient to give the opening of valve 32 required to operate the gun at the same velocity as the telescope. In order, therefore, to hold the gun in positional agreement with a moving telescope, valve 32 must be controlled independently of valve rod 26 so that while the valve rod is maintained in its initial position in space, corresponding to this relation, the gun is driven at the required velocity. This I have affected by temporarily lengthening or shortening the connection between valve rod 26 and valve 32, which I accomplish automatically by the means of the auxiliary hydraulic motor.

The action of the auxiliary hydraulic motor in controlling valve 32 is as follows: Upon movement of valve rod 26 under the influence of selsyn motor 22 and simultaneously with the consequent opening movement imparted to valve 32 through link 56, an opening movement is imparted to auxiliary valve 43 through lever 52. This causes the piston 41 of the auxiliary motor to operate, its movement being transmitted through lever 55 to valve 32 and being in a direction to increase the initial opening movement given valve 32 upon displacement of valve rod 26. The operating connection between valve rod 26 and valve 32 is in this manner temporarily increased or shortened as the case may be by the auxiliary hydraulic motor to correspond with the velocity of the telescope. The movement of the auxiliary hydraulic motor takes place slowly and the main hydraulic motor is thus gradually accelerated to cause the gun to overtake the telescope.

As the gun approaches positional agreement with the telescope, valve rod 26 approaches its initial position in space, which corresponds to the condition of angular agreement, closing valve 43 of the auxiliary hydraulic motor and simultaneously therewith tending to close valve 32. The opening effect of the auxiliary hydraulic motor on valve 32 predominates the tendency of valve rod 26 to close the valve, however, so that the gun is driven at a higher speed than the telescope, but the opening effect of the auxiliary hydraulic motor gradually decreases due to the closing of its valve by valve rod 26 so that the velocity of the gun gradually decreases. When the gun comes into positional agreement with the telescope, valve rod 26 reaches its initial space position closing valve 43 thus stopping the auxiliary hydraulic motor, the final adjustment of valve 32 under the joint influence of the auxiliary hydraulic motor and valve rod 26 being such as to cause the main hydraulic motor to drive the gun at the same speed as the telescope. The gun is thus brought into positional agreement with the telescope and will be operated in synchronism with the telescope as long as the telescope is moved at a constant velocity.

Under conditions of synchronous operation of the gun and the telescope it will be observed that selsyn motor 22 rotates continuously tending to impart a movement of translation to valve rod 26, but this tendency is exactly counterbalanced by translation of quill 25 in the opposite direction under the influence of main hydraulic motor 10. The valve rod, therefore, is maintained in a fixed position in space, which position is its initial position corresponding to a condition of positional agreement of the gun and the telescope.

Upon change in the velocity of motion of the telescope, the condition of angular agreement of the telescope with the gun is disturbed, which would result in a momentary displacement of a valve rod 26 in a direction to produce a corresponding change in the velocity of the main hydraulic motor through the direct connection of the valve rod with valve 32. Simultaneously therewith valve 43 is opened through lever 52 in a direction to cause valve 32 to be actuated under the influence of the auxiliary hydraulic motor so as to gradually restore the synchronous relation between the gun and the telescope. That is to say, the length of the connection between valve rod 26 and valve 32 is adjusted to correspond with the new velocity of the telescope. If the velocity of the telescope becomes zero, the adjusted length of this connection will be the same as the initial length when all parts are at rest, as shown in the drawing.

It will be observed that when the gun is being driven in synchronism with the telescope, the auxiliary hydraulic motor is at rest, and hence no hydraulic liquid is supplied to it. Consequently, under such conditions, there is no drop in pressure across needle valve 46, and plunger 63 is therefore forced upward by spring 65, whereby contact 66 is brought into engagement with contact 67. As long as the auxiliary hydraulic motor is in operation, the supply of hydraulic fluid passing to it causes a pressure drop across the needle valve maintaining the contacts open. The contacts 66 and 67 are therefore in closed position only when the gun is in agreement with the telescope, and it is therefore impossible to fire the gun under any other conditions. The operator may hold his firing circuit switch in handle 17 closed if he desires, depending upon the contact device to fire the gun as soon as it comes into agreement. If desired, the needle valve may be adjusted so that the contacts are closed when the gun is within a predetermined limited range of movement with relation to the telescope.

Although I have shown the gun as being operated in a parallel relation with the telescope, it may be and usually is necessary to give the gun an elevation for range with relation to the telescope. In such case the gun is in positional agreement with the telescope when that angular relation is established. Positional agreement therefore within the meaning of the appended claims may be any predetermined relation which it is desired to maintain.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:

1. Automatic synchronizing apparatus comprising in combination with a moving object and a driven object, of primary operating means for said driven object controlled in response to relative movement of said objects, and secondary operating means responsive to relative movement of said objects for automatically controlling said primary operating means so as to accelerate said driven object into synchronism with the moving object.

2. Automatic synchronizing apparatus comprising in combination with a moving object and driven object, of primary operating means for said driven object, secondary operating means controlling said primary operating means, and actuating means responsive to relative movement of said objects for controlling said primary and secondary operating means, whereby said primary operating means is controlled jointly by said actuating means and said secondary operating means so as to move said driven object in response to movement of and in synchronism with said moving object.

3. Automatic synchronizing apparatus comprising in combination with a moving object and a driven object, of primary operating means for said driven object, secondary operating means controlling said primary operating means, and actuating means differentially responsive to movement of said objects for controlling said primary and secondary operating means, whereby said primary operating means is controlled jointly by said actuating means and said secondary operating means so as to accelerate said driven object into positional agreement with said moving object and then operate said driven object in synchronism with said moving object.

4. Automatic synchronizing apparatus comprising in combination with a moving object and a driven object, of a hydraulic motor operatively connected to said driven object, a control valve therefor, actuating means for said valve responsive to relative movement of said objects, and auxiliary operating means controlled by said actuating means for giving said valve an additional displacement, whereby said hydraulic motor is controlled jointly by said actuating means and said auxiliary operating means so as to move said driven object in response to movement of and in synchronism with said moving object.

5. Hydraulic mechanism comprising in combination with a moving object and a driven object, of a hydraulic motor operatively connected to said driven object, a control valve for said hydraulic motor, control means for opening said valve in response to relative movement of said objects, and auxiliary operating means responsive to said control means for giving said valve an additional displacement whereby said hydraulic motor is caused to accelerate said driven object into positional agreement with said moving object and then operate said driven object in synchronism with said moving object.

6. Automatic synchronizing apparatus comprising in combination with a moving object and a driven object, of a hydraulic motor operatively connected to said driven object, a control valve therefor, actuating means for said valve responsive to relative movement of said objects, and auxiliary operating means controlled by said actuating means for giving said valve an additional displacement, whereby said hydraulic motor is controlled jointly by said actuating means and said auxiliary operating means so as to accelerate said driven object into positional agreement with said moving object and then operate said driven object in synchronism with said moving object.

7. Automatic synchronizing apparatus comprising in combination with a moving object and a driven object, of a main hydraulic motor operatively connected to said driven object, a control valve therefor, an auxiliary hydraulic motor operatively connected to said control valve, a control valve therefor, and actuating means for said control valves responsive to relative movement of said objects, whereby said main hydraulic motor is controlled jointly by said actuating means and said auxiliary hydraulic motor so as to move said driven object in response to movement of and in synchronism with said moving object.

8. Automatic synchronizing apparatus comprising in combination with a moving object and a driven object, of a main hydraulic motor operatively connected to said driven object, a control valve therefor, an auxiliary hydraulic motor operatively connected to said control valve, a control valve therefor, and actuating means for opening said control valves in response to movement of said moving object and for closing said valves in response to movement of said driven object, whereby said main hydraulic motor is controlled jointly by said actuating means and said auxiliary hydraulic motor so as to move said driven object in response to movement of and in synchronism with said moving object.

9. Automatic synchronizing apparatus comprising in combination with a moving object and a driven object, of a main hydraulic motor operatively connected to said driven object, a control valve therefor, an auxiliary hydraulic motor operatively connected to said control valve, a control valve therefor, and actuating means differentially responsive to movement of said objects for controlling said valves, whereby said main hydraulic motor is controlled jointly by said actuating means and said auxiliary hydraulic motor so as to move said driven object in response to movement of and in synchronism with said moving object.

10. Automatic synchronizing apparatus comprising in combination with a gun and a sighting device of a main hydraulic motor operatively connected to said gun, a control valve therefor, an auxiliary hydraulic motor operatively connected to said control valve, a control valve therefor, and actuating means for said control valves responsive to relative movement of said objects, whereby the gun is moved in positional agreement with the sighting device, an electric firing circuit for the gun, and control means for said firing circuit responsive to the flow of hydraulic liquid to said auxiliary hydraulic motor, whereby said firing circuit is maintained open except when the gun and the sighting device are in positional agreement.

11. Automatic synchronizing apparatus comprising in combination with a gun and a sighting device, of a main hydraulic motor operatively connected to said gun, a control valve therefor, an auxiliary hydraulic motor operatively connected to said control valve, a control valve therefor, and actuating means for said control valves responsive to relative movement of said objects, whereby the gun is moved into positional agreement with the sighting device, an electric firing circuit for the gun, a restricted opening in the hydraulic supply main for said auxiliary hydraulic motor creating a drop in pressure when said auxiliary hydraulic motor is in operation, and a pressure controlled contact device in the firing circuit of said gun responsive to said drop in pressure, whereby said firing circuit is maintained open except when the gun and the sighting device are in positional agreement.

In witness whereof I have hereunto set my hand this 27th day of Dec., 1921.

HENRY E. WARREN.